United States Patent
Mood

(10) Patent No.: US 10,232,917 B2
(45) Date of Patent: Mar. 19, 2019

(54) WELL AND SERVICE VESSEL FOR TRANSPORT AND STORAGE OF AQUATIC ORGANISMS

(71) Applicant: Fredrik Mood, Oslo (NO)

(72) Inventor: Fredrik Mood, Oslo (NO)

(*) Notice: Subject to any disclaimer, the term of this patent is extended or adjusted under 35 U.S.C. 154(b) by 123 days.

(21) Appl. No.: 15/027,303

(22) PCT Filed: Oct. 7, 2014

(86) PCT No.: PCT/NO2014/050188
§ 371 (c)(1),
(2) Date: Apr. 5, 2016

(87) PCT Pub. No.: WO2015/053635
PCT Pub. Date: Apr. 16, 2015

(65) Prior Publication Data
US 2016/0244130 A1    Aug. 25, 2016

(30) Foreign Application Priority Data
Oct. 8, 2013   (NO) .................................. 20131346

(51) Int. Cl.
*B63B 35/26*   (2006.01)
*A01K 63/02*   (2006.01)
(Continued)

(52) U.S. Cl.
CPC .............. *B63B 35/26* (2013.01); *A01K 61/60* (2017.01); *A01K 63/02* (2013.01); *A01K 63/04* (2013.01);
(Continued)

(58) Field of Classification Search
CPC ................................ B63B 35/26; B63B 35/42
(Continued)

(56) References Cited

U.S. PATENT DOCUMENTS 4,297,804 A * 11/1981 Weld ...................... A01K 97/05
43/55
4,683,832 A * 8/1987 Dysarz .................. B63B 35/003
114/258

(Continued)

FOREIGN PATENT DOCUMENTS

| GB | 967793 | 8/1964 |
| GB | 1436125 | 5/1976 |

(Continued)

OTHER PUBLICATIONS

International Search Report PCT/NO2014/050188 dated Feb. 9, 2015.
(Continued)

*Primary Examiner* — Stephen P Avila
(74) *Attorney, Agent, or Firm* — Young & Thompson

(57) ABSTRACT

An arrangement, a system and a method relating to a well boat- and service vessel (1) for transporting or storing fish or other aquatic organisms. There are provided, inter alia, a well boat- and service vessel (1) that includes a self-floating, exchangeable well unit (2), a propulsion unit (3), wherein the propulsion unit includes propulsion elements (4), steering and positioning elements, a dock (5) for the well unit, positioning and attachment elements for positioning and securing the well unit (2) in the dock (5).

15 Claims, 5 Drawing Sheets

(51) Int. Cl.
  *B63B 27/36*    (2006.01)
  *B63B 35/42*    (2006.01)
  *B63B 25/00*    (2006.01)
  *B63B 43/06*    (2006.01)
  *A01K 63/04*    (2006.01)
  *A01K 73/00*    (2006.01)
  *A01K 97/20*    (2006.01)
  *A01K 61/60*    (2017.01)
  *B63B 35/14*    (2006.01)

(52) U.S. Cl.
  CPC .............. *A01K 73/00* (2013.01); *A01K 97/20* (2013.01); *B63B 25/006* (2013.01); *B63B 27/36* (2013.01); *B63B 35/42* (2013.01); *B63B 43/06* (2013.01); *B63B 35/14* (2013.01); *Y02A 40/826* (2018.01)

(58) Field of Classification Search
  USPC ........................................................ 114/258
  See application file for complete search history.

(56) References Cited

U.S. PATENT DOCUMENTS

| | | |
|---|---|---|
| 4,994,177 A | 2/1991 | Bogar, Jr. |
| 5,331,914 A | 7/1994 | Salmons |
| 7,654,211 B2* | 2/2010 | Maloney ................ B63B 35/42 |
| | | 114/258 |
| 2006/0086304 A1 | 4/2006 | Menard |
| 2007/0068063 A1 | 3/2007 | Simpson |
| 2012/0024211 A1 | 2/2012 | Wiltse |

FOREIGN PATENT DOCUMENTS

| | | |
|---|---|---|
| GB | 1450575 | 9/1976 |
| JP | 62132893 | 8/1987 |
| JP | 04342690 | 11/1992 |
| JP | 05301594 | 11/1993 |
| JP | 08163938 | 6/1996 |
| NO | 20100465 | 10/2011 |
| NO | 332244 | 8/2012 |

OTHER PUBLICATIONS

International Preliminary Report on Patentability PCT/NO2014/050188 dated Dec. 29, 2015.

Norwegian Search Report dated Apr. 9, 2014; Application No. 20131346.

Danish Search Report dated Mar. 16, 2017; Application No. PA 2016 70291.

\* cited by examiner

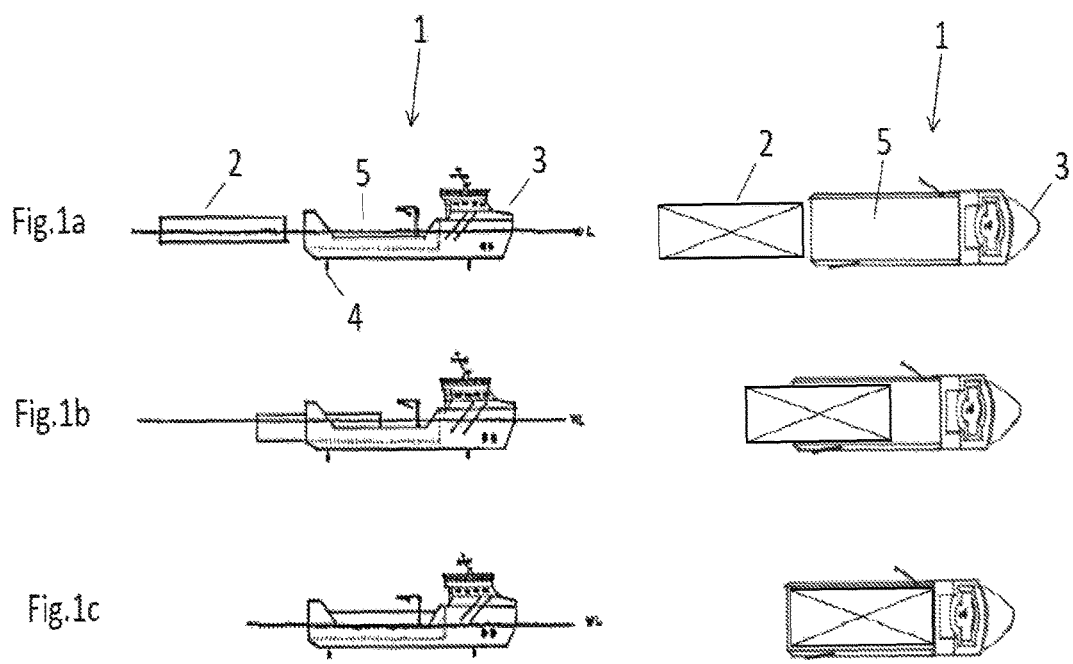

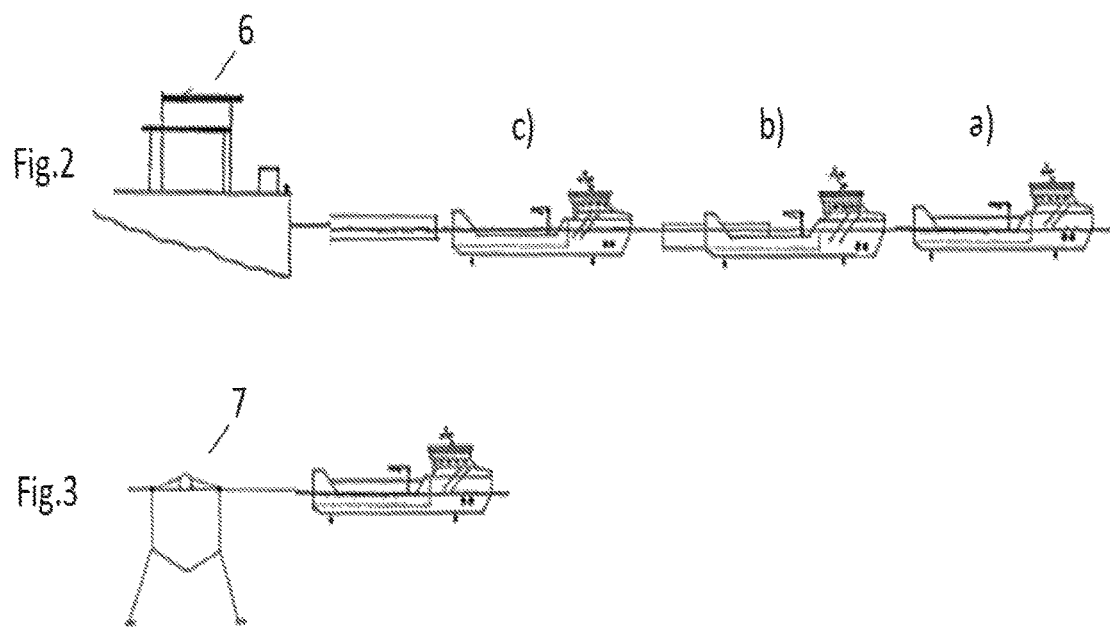

WELL AND SERVICE VESSEL FOR TRANSPORT AND STORAGE OF AQUATIC ORGANISMS

THE FIELD OF THE INVENTION

The present invention relates to a well boat- and service vessel system for transporting or storing fish or other aquatic organisms.

BACKGROUND FOR THE INVENTION

In loading, unloading, transport and treatment of, e.g., farmed fish to or from a net cage and/or slaughterhouse, conventional so-called well boats are used. A well boat may be a very advanced and expensive vessel that is equipped with a number of tools in addition to the conventional well or basin that should hold farmed fish or other aquatic organisms. The well boat is generally provided with a loading/unloading system, cleaning system, oxygen supply system, penetration system, fish counter, various lifting systems/cranes, washing systems and living quarters/lounges for the workers on board. A conventional well boat often services a number of fish farms and must run in shuttle traffic between different net cages and slaughterhouses. To avoid the spread of various types of fish diseases or parasites, e.g., ILA, PD, IPN, HSMB, Vibriose, Furunculosis, sea lice, etc., there are requirements for the cleaning of equipment and hull and requirements for observing quarantine periods/procedures. The costs of operating a well boat are high and efficiency is relatively low.

There has been and is now considerable focus on the negative consequences resulting from fish breeding and well boat transport of live fish from hatchery to cage, between cages, or from cage to slaughterhouse. The negative consequences are especially associated with fish escape, sea lice, spread of disease and, not least, the welfare and quality of the fish. At the beginning of 2013 the Norwegian Food Safety Authority (Mattilsynet) was commissioned by the Ministry of Fisheries and Coastal Affairs to review various measures intended to reduce the risk of disease dissemination in transport of farmed fish with a well boat.

"The Norwegian fish breeding industry is completely dependent on transporting fish with well boats. With the growth of the industry, the well boat traffic has also increased accordingly, and the boats have become larger. The fish are moved over relatively large distances, and transport of farmed fish in well boats is generally carried out with open bottom valves. This entails a risk of disease dissemination.

"When transporting table fish there is a need to reduce the risk that infection will be spread from the fish in the well boat to fish in aquaculture installations and to wild fish. When transporting juveniles there is first and foremost a need to reduce the risk that the fish in the well boat will be infected via transport water taken in during transportation. Similarly, in the transport of broodfish it is necessary both to reduce the risk that the broodstock will be infected and to reduce the danger of disease dissemination to the surroundings.

"To reduce the risk of infection during transport of farmed fish with a well boat, the Norwegian Food Safety Authority has proposed amendments to the Regulations of 17 Jun. 2008, No. 820, on the transport of aquaculture animals (the transport regulation) . . . . The proposal means that, from 1 Jan. 2019, it will be required that all well boats shall treat transport water with an approved disinfection method and with disinfection equipment that is proven to be effective. The disinfection efficacy and capacity must be sufficient to handle all water intake or discharge water depending on whether it is hatchery fish, table fish or broodstock that is being transported."

The Norwegian Food Safety Authority also proposes that, "from 1 Jan. 2015, there shall be a requirement for geographic tracking of well boats, and the requirement that information on the position of the bottom valves shall be registered and logged automatically on the boat." A draft of the regulation for amendment in the regulations relating to transport of aquaculture animals can be downloaded on the www.mattilsynet.no homepage.

Despite a strong focus on approaches to the problems relating to transport of live fish and stricter regulations, there are still major challenges. Loading and unloading of live fish to and from a well boat, for example, is an operation involving a high risk of escape, either due to damage/injury to a cage by the well boat when anchoring at the edge of the cage, or through technical or human error in the loading and unloading system during operation.

Escape of fish not only causes considerable financial loss for the breeder, but it also constitutes a major environmental problem. In the extreme consequence, the fish can mingle with wild fish and ruin its genetic diversity. In addition, escaped fish may be infected with various types of parasites and diseases that can in this way be transferred and spread to wild fish strains in the area and to neighboring fish farms. Hence there is a need for solutions that will prevent escape.

The current use of open holding cages is also a subject of discussion, with more and more countries today requiring the use of closed installations at sea or on land. Closed systems could provide for better fish welfare, which in turn results in better quality. An alternative to the use of holding cages, whether open or closed, is direct slaughtering at the cage or at the quay. The latter method will lead to reduced salmon prices and prevent optimal utilization of the slaughterhouse's capacity.

Today there is high mortality involved in smolt stocking. The survival capability is affected by water quality, velocity of flow, temperatures, light, and other factors. A controlled familiarization environment for production of large smolt is an important measure to reduce mortality. It has been demonstrated, inter alia, that low salinity and water flow produce healthier and more resistant fish. Stocking of large smolt also means that the salmon will on average spend fewer months in the sea, which contributes toward reducing the risk of financial loss. The operational process can also be managed so that it is possible to slaughter and deliver the fish steadily throughout the entire year.

Today there are few solutions and measures for preventing infection once disease has been established, aside from slaughtering. A closed system thus could conceivably function as a quarantine facility, wherein medicinal measures can be undertaken without affecting the surroundings. It is also a paradox that today the same well boat that transports healthy fish is used to transport sick fish—a practice which quite clearly constitutes an infection risk. There are, however, special requirements for quarantine periods and standards for washing and disinfecting, but these impose unnecessarily high costs on the breeder as a result of the downtime involved.

With respect to sea lice, there are currently used large quantities of insecticides (for example, pyrethroids/pyrethrin or other similar agents which, inter alia, attack and restrain enzymes involved in the chitin production and thereby retard the development of the shell and other chitin-containing organs, for example, reproductive organs and gripping organs in salmon lice) and other medicines to keep down the proportion of parasites. Flubenzurons are examples of another toxin that is used. The disadvantage of such treatment is that the salmon have to work themselves "clean" for several months after they have been exposed to the toxin.

In the case of lice treatment, it is currently required that this be done in a closed system (net cages, or well boats). The drawback is that it cannot be proven with certainty that the treatment has been sufficient. The most extreme consequence is that the parasites are only knocked out temporarily, and will gradually be able to develop resistance to these agents. The wild fish that live around the fish farms will be deloused only to a slight degree and, as a result, could be weakened and then die from the injuries they sustain. In addition, fish that have escaped or been infected with lice could spread the resistant salmon lice to other fish and thereby further damage the wild fish stock.

Algae growth in the sea as a result of an accumulation of nutrients from food, etc., is also a problem that can have negative consequences for the fish breeding industry. For example, four to six cages having up to 200,000 salmon in each will produce excrement corresponding to that produced by a city of about 60,000 people. Large algae concentrations can give the water an undesirable color, smell and taste, and certain algae types can even develop toxins that can be injurious to animals and people. In addition, the growth of large quantities of algae could render the water oxygen-free, which could be a problem, inter alia, in breeding farms for fresh water fish.

Consequently, there is a need for a breeding facility for fish and also other aquatic organisms (crustaceans [crawfish, lobsters]), mollusks [mussels, scallops, oysters, etc.], and so on) that can reduce or entirely avoid the above-mentioned problems of infection, escape, contamination, etc. A system in which the average number of months in the sea is reduced and where one has full control of all logistics to and from the fish farms will be the key to a sustainable growth in the aquaculture industry.

The loss/waste situation for all fish stocked in fish farms according to the prior art is:
6.1% mortality due to poor smolt quality.
6.0% mortality due to the conditions at the locality.
3.8% mortality due to contracted disease.

Preventative solutions are robust smolt, good localities, measures for preventing infection and gentle handling.

The future for the Norwegian and international fish breeding industry faces major challenges, and the present invention could thus open up possibilities that could develop/lead the industry in a sustainable and environmentally friendly direction.

THE PRIOR ART

As mentioned above, it is known to use well boats as a temporary storage place for fish that are to be transferred live from one net cage to another or from a fish farm to land-based fish filleting factories. In such well boats the water is circulated by means of the vessel's speed through the water, with intake of water at the bow of the boat where water is pressed into valves and then drawn out in the after end of the boat when the boat is driven forward. Salmon and trout can also be carried in a so-called "closed system," where the wells are not supplied with fresh water, but where the wells are closed and the water is recirculated by means of a pump system which adds oxygen to the water. In closed transport it is important that the carbon dioxide that is produced be vented out. According to the prior art, this is achieved in a separate system in which the water is pumped up into an "air box" where the water is whipped up and carbon dioxide is released.

According to the prior art, well boats are also used to transport fish in bulk. Some members of the coastal fishing fleet gather the fish they catch in cages because they lack the capacity to transport the fish themselves. When it is needed, a well boat is hired to transport the fish to a packaging plant/further processing. Here the fish are chilled during transport by the boat's RSW system. The catch may also be mixed with ice, but this is less common and the method is preferably used in the summer when temperatures are high.

It is previously known to use semi-submersible ships (heavy cargo ships) to lift other ships or offshore installations up from the water and transport them. Such heavy cargo ships utilize ballast tanks to regulate the ship's displacement, which makes it possible to lower and raise it in the water. When the deck is lowered well below the surface of the water, liquid cargo can be moved into place to then be raised up from the water again. To balance the load, the different tanks can be pumped in a non-uniform manner.

It is previously known to utilize a «PickUpCat» ship, where the idea is that the engine module and the cargo module of a ship can be separated, thus saving time during loading and unloading.

In contrast to the present invention, such heavy cargo and transport ships have only been used for lifting and transport operations and are thus not fitted with technical equipment adapted for a specially designed barge having a water purification device.

GENERAL DESCRIPTION OF THE INVENTION

The object of the present invention is to remedy at least one of the above-mentioned disadvantages or problems.

One objective of the invention is to provide a system that is more cost-effective.

A second possible objective is to provide a system that is more time-effective.

A third possible objective is to provide a system that is more effective in combating the spread of disease.

A fourth possible objective is to provide a system that improves the production quality.

A fifth objective is to provide a system that reduces production loss.

These and other possible objectives are achieved by means of an arrangement, a system and a method as disclosed in the attached independent claims. Other advantageous or alternative embodiments are disclosed in the dependent claims.

In one aspect, the invention provides an arrangement for a well boat- and service vessel for transporting or storing fish or other aquatic organisms, where the well boat- and service vessel comprises a self-floating, exchangeable well unit, a propulsion unit, where the propulsion unit comprises propulsion means, steering and positioning means, a dock for the well unit, positioning and attachment means for positioning and securing the well unit in the dock, and a ballast system for raising and lowering the propulsion unit in the water.

In another aspect, the invention provides an arrangement for a well boat- and service vessel for transporting or storing fish or other aquatic organisms, where the well boat- and service vessel comprises a self-floating, exchangeable well unit, where the well unit comprises a ballast system for raising and lowering the propulsion unit in the water, a propulsion unit, where the propulsion unit comprises propulsion means, steering and positioning means, a dock for the well unit, positioning and attachment means for positioning and securing the well unit in the dock.

The invention also provides a system for a well boat- and service vessel for transporting or storing fish or other aquatic organisms, where the well boat- and service vessel comprises a plurality of self-floating, exchangeable well units, a propulsion unit, where the propulsion unit comprises propulsion means, steering and positioning means, a dock for at least one of the well units, positioning and attachment means for positioning and securing at least one of the well units in the dock.

Further, the invention provides a method for the use of a well boat- and service vessel for transporting or storing fish or other aquatic organisms, where the well boat- and service vessel comprises a self-floating, exchangeable well unit and a propulsion unit, where the propulsion unit comprises propulsion means, steering and positioning means, a dock for the well unit, positioning and attachment means for positioning and securing the well unit in the dock and a ballast system for raising and lowering the propulsion unit in the water, said method comprising the steps of maneuvering the propulsion unit to the well unit, lowering the propulsion unit down into the water by means of the ballast system so that the propulsion unit is able to drive in under the well unit, positioning and attaching the well unit in the dock on the propulsion unit, wherein this operation comprises the act of raising the propulsion unit, and transporting the well unit with the aid of the propulsion means on the propulsion unit to a destination.

Alternatively, the invention provides a method for the use of a well boat- and service vessel for transporting or storing fish or other aquatic organisms, where the well boat- and service vessel comprises a self-floating, exchangeable well unit and a propulsion unit, where the propulsion unit comprises propulsion means, steering and positioning means, a dock for the well unit, positioning and attachment means for positioning and securing the well unit in the dock, and where the well unit comprises a ballast system for raising and lowering the well unit in the water, said method comprising the steps of maneuvering the propulsion unit to the well unit, raising the well unit up in the water by means of the ballast system, so that the propulsion unit is able to drive in under the well unit, positioning and securing the well unit in the dock on the propulsion unit, wherein this operation comprises the act of lowering the well unit, and transporting the well unit with the aid of the propulsion means on the propulsion unit to a destination.

According to the invention the well unit can be delivered to the destination by reversing the given steps, whereupon the propulsion unit proceeds to another location to fetch another well unit, thereafter to bring this to a new destination, or the well unit can be delivered to the destination by reversing the given steps, whereupon the propulsion unit takes with it another well unit from the destination and brings the well unit to a new destination.

In the following is given a detailed description of some advantageous embodiments, with reference to the attached figures. The embodiments disclosed are not meant to be limiting to the scope of the claims. For example, although the description discloses embodiments that relate to salmon, it must be understood that the invention is equally applicable for use in connection with other aquatic organisms, other types of cages, other potential work operations, etc.

BRIEF DESCRIPTION OF THE FIGURES

FIG. 1a-c shows an embodiment of the present invention seen from the side and from above, respectively, where the steps that are shown illustrate an operation made possible by the present invention, FIG. 2a-c shows an embodiment of the present invention where a self-floating, exchangeable well unit is delivered to a slaughterhouse, FIG. 3 shows a well boat- and service vessel according to the present invention alongside a holding cage.

DETAILED DESCRIPTION

Figure 4:
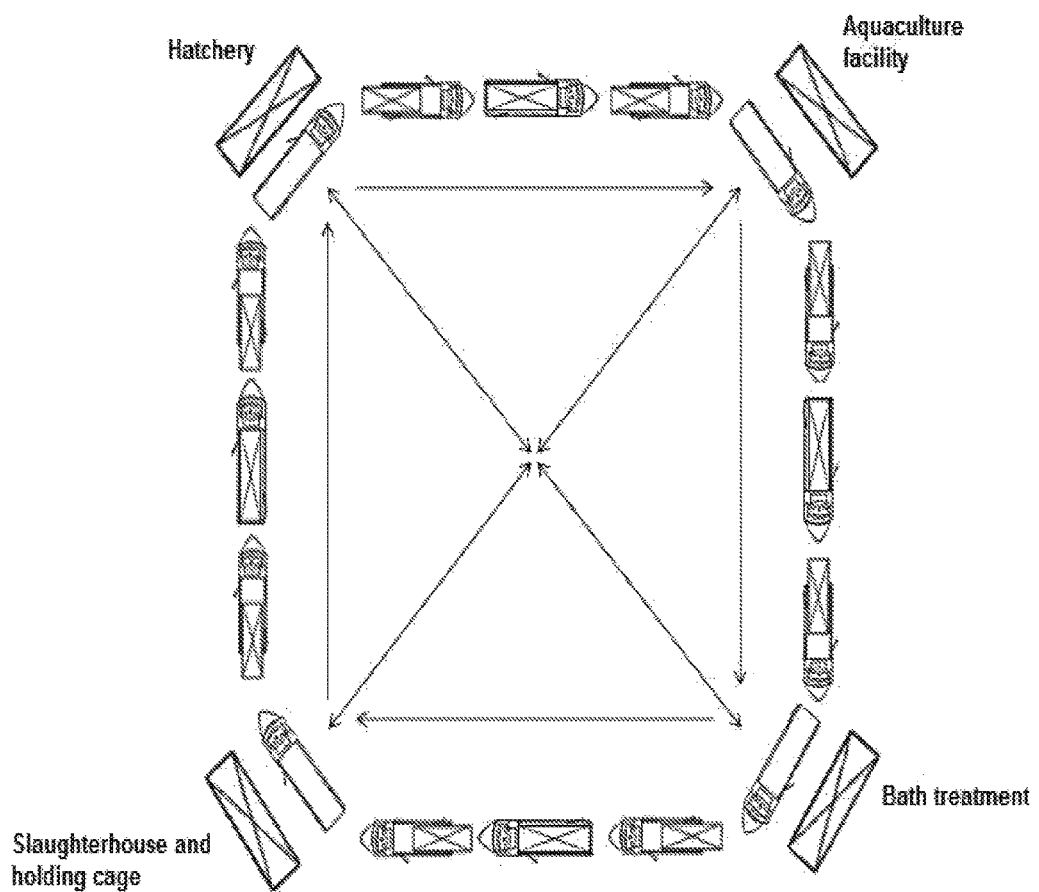
FIG. 4 shows how a well boat- and service vessel according to the present invention can be used to carry out ordinary work operations at and between the slaughterhouse and the holding cage, hatchery, transport and lice treatment.

FIG. 1a-c shows a well boat- and service vessel 1 according to the present invention comprising a self-floating, exchangeable well unit 2 and a propulsion unit 3, steering and positioning means, a dock 5 for the well unit 2, positioning and attachment means for positioning and securing the well unit 2 in the dock 5 and a ballast system to raise and lower the propulsion unit 3 in the water.

The well boat- and service vessel 1 shown in FIG. 1a-c is designed to enable an operation comprising the steps of maneuvering propulsion unit 3 to well unit 2 (FIG. 1a), lowering propulsion unit 3 down in the water by means of the ballast system so that propulsion unit 3 is able to drive in under well unit 2 (FIGS. 1a and 1b), positioning and securing well unit 2 in dock 5 on propulsion unit 3 (FIGS. 1b and 1c), wherein this operation comprises the act of raising propulsion unit 3 (FIG. 1c). When well unit 2 has been securely attached to propulsion unit 3 and propulsion unit 3 has been raised, then well unit 2 can be transported to a desired destination with the aid of propulsion means 4 on propulsion unit 3.

FIG. 2 shows the well- and service vessel 1 according to the present invention in the act of either delivering (a→c) or fetching (c→a) well unit 2 by means of propulsion unit 3 to or from a slaughterhouse 7. It is understood that propulsion unit 3 can carry out other work operations whilst well unit 2 is situated by the slaughterhouse 6, e.g., fetching/bringing other well units to/from other destinations, waiting in quarantine zones, etc. In this way the efficiency of propulsion unit 3 is increased considerably, since the work operations requiring that the actual well unit 2 be situated near the slaughterhouse, a cage, a hatchery, etc., can be fully carried out.

FIG. 3 shows the well boat- and service vessel 1 according to the present invention whilst it is situated by a holding cage 7. The well boat- and service vessel 1 may be, e.g., in the process of delivering or fetching well unit 2.

FIG. 4 shows how the well boat- and service vessel 1 according to the present invention can be used to carry out a number of required work operations. These may involve a plurality of well units 2 that are fetched or delivered by means of propulsion unit 3. Propulsion unit 3 can move among all stations to carry out other work operations while the rest of the well units 2 are positioned at their respective stations waiting for the fish to be loaded or unloaded, to be acclimatized, to be fully processed, etc. Since propulsion unit 3 is able to service a large number of well units 2, the well boat- and service vessel 1 according to the present invention would be able to carry out the same amount of work as a plurality of conventional well boats. Such an improvement in efficiency could result in major savings in costs and time.

Figure 5:
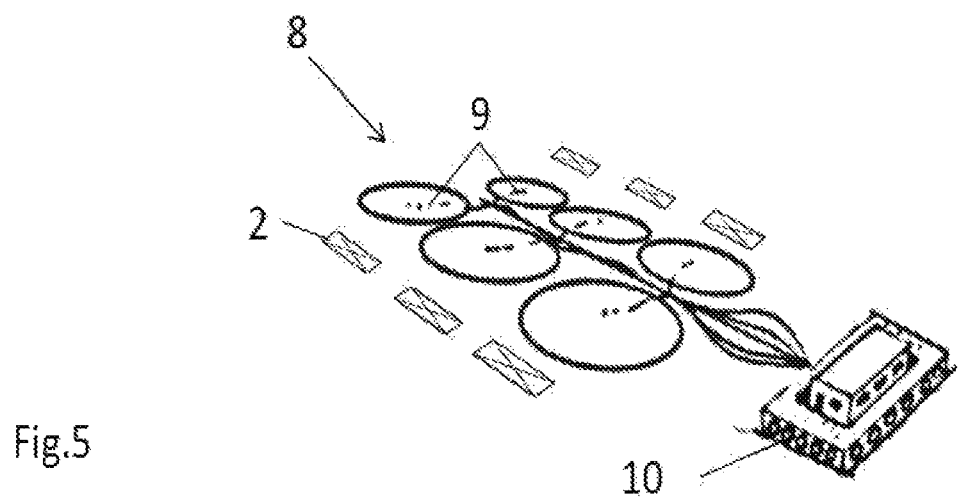
FIG. 5 shows a cage installation having a plurality of cages and a corresponding number of associated self-floating, exchangeable well units in addition to an appurtenant floating platform.

FIG. 5 shows a cage installation 8 comprising six cages 9 and a floating concrete platform 10. FIG. 5 shows that each cage may be allocated its own well unit 2, with different work operations progressing in parallel while propulsion unit 3 is occupied elsewhere with other work operations. Concrete platform 10 can be fitted with various types of equipment enabling it to carry out necessary work operations without the need for propulsion unit 3 to stay nearby.

Figure 6:
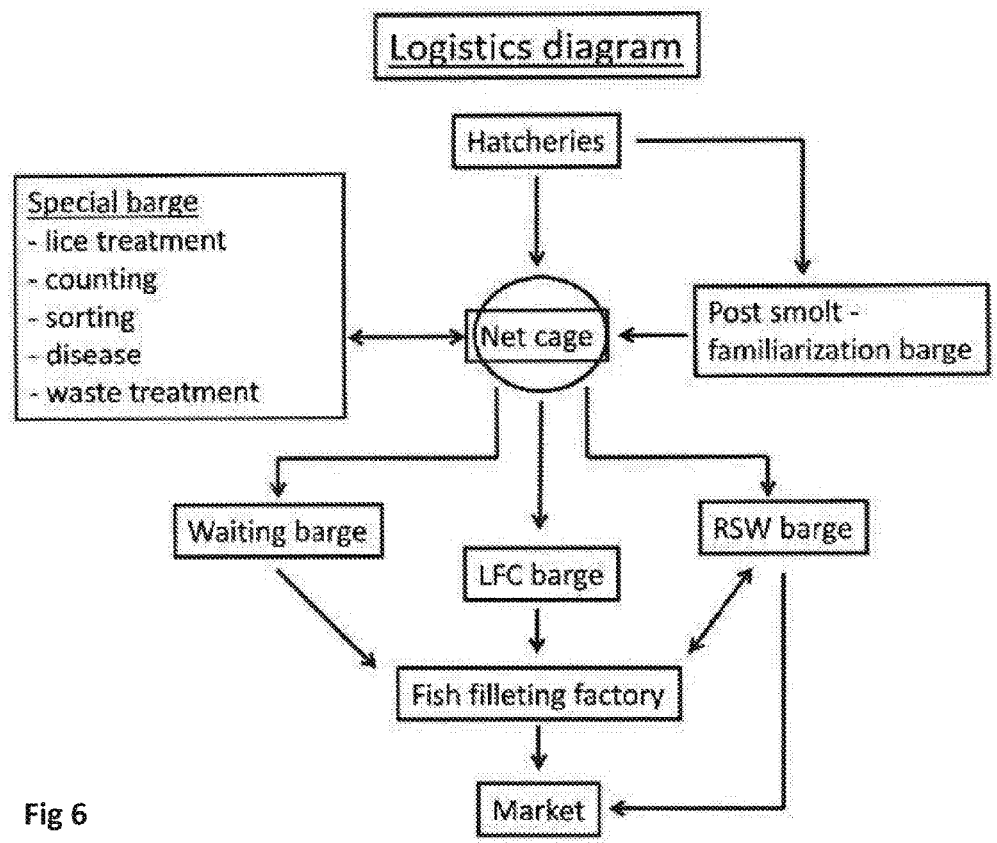
FIG. 6 shows a flow chart illustrating a possible logistics plan in connection with a cage installation.

FIG. 6 shows a flow chart illustrating a possible logistics plan in connection with a cage installation. All of the arrows in the flow chart can, in principle, indicate a stage of transport involving a separate well unit 2, where only one propulsion unit 3 is needed to service a plurality of well units, each of which is involved in its own work operations that can proceed simultaneously or in parallel without propulsion unit 3 having to wait for the work operations to be carried out. This could be very effective in saving costs and time.

Well unit 2 may consist of a barge, either double bottomed or single bottomed, comprising its own equipment such as ballast system, positioning system, anchor system, cleaning system, penetration system, etc. Each barge can be equipped according to the intended areas of use and needs, and equipment may also be mounted afterwards if there need for it at a later time.

Propulsion unit 3 can initially be equipped as a conventional well boat, but it must include a dock 5 into which a well unit 2 can be placed. The distribution of equipment between propulsion unit 3 and well unit 2 is essentially optional and dependent on need. Below is found a long list of functions and equipment that may be relevant to incorporate in a well boat- and service vessel 1 in accordance with the present invention, but these should not be considered to be limiting or necessary in order to exploit the advantages of the invention.

It is also conceivable that it is well unit 2 that is the element that can be raised and lowered instead of propulsion unit 3. Such an alternative system will have all the same advantages and possibilities as those mentioned above.

Possible Areas of Use:

Barge to Replace a Holding Cage:

To replace the current use of open holding cages. By having a system that ensures good, stable water quality, we can enhance the welfare of the fish. The fish are subjected to minimal stress and their quality is thus not diminished. A stress-free existence enables quick and effective slaughtering (pre rigor). The use of a holding installation, a waiting barge, is more economical for the breeder and the slaughterhouses since the slaughterhouses thereby have better control of the market when the price is not determined by the need to sell the slaughtered fish within a deadline.

It is also conceivable that, for a period prior to slaughtering, the fish could be fed special feed that increases their omega 3 content, etc. Optimal water conditions in the final phase can also enhance the quality.

Quarantine Barge:

When there is a risk of disease, etc., it is conceivable that the barge can function as a 100%-controlled facility having equipment for medication and monitoring, where potentially sick fish can be put in quarantine. The quarantine barge can be moved, for example, to a predefined mooring site where one can treat the fish and prevent the spread of infection to other installations. The barge can also be put in quarantine after freighting of sick fish without incurring excessive economic consequences for the ship owner and breeder. The precautionary principle.

Breeding Barge:

Enables smaller operators themselves to start fish breeding in their own closed/semi-closed breeding facility. If organized correctly, a system can be obtained that enables them to compete on the same terms as the major operators, and thus deliver a sustainable product that is competitive in both price and, not least, quality. Smaller semi-closed facilities will have less negative impact on the surroundings/environment. This in turn makes possible a controlled, sustainable growth in aquaculture, in observance of regional policy considerations. The barge can easily be transported to and from the breeder by the specially adapted lifting vessel without danger of disease dissemination.

Familiarization Barge for Large Smolt:

Survival capability is affected by water quality, velocity of flow, temperature, light, and other factors. Stocking of large smolt means that the salmon on average spend fewer months in the sea, which contributes toward reduced risk of financial loss. The operational process can also be controlled so as to enable a steady pace of slaughtering and delivery throughout the year. By using the barge as both a breeding and a transport unit, one avoids stressing the fish unnecessarily, thus helping to reduce mortality.

Delousing Barge:

There is a requirement today for a closed bath treatment for the removal of lice. This is done by the use of well boats or specially designed net cages. Today's delousing methods are often complicated and entail an increased risk of escape. The present invention could be specially designed for this purpose only, which would provide for more effective and, not least, permanent delousing, with dosage control, zero discharge, enhanced fish welfare, etc. This would mean that the wild fish and organisms living around the fish farms are affected to only a slight degree, at the same time as the problem of sea lice is reduced.

Well Barge:

Performs the typical functions of a well boat. In addition, the ship would be able to carry out other functions, including delivery of feed, fuel, etc.

Waste Barge:

Accumulation of nutrients from feed, etc. is a problem that can have negative consequences for the fish breeding industry. If a fivefold increase in today's production is to become a reality, then it most probably will be necessary to recycle the waste. Barges can therefore be constructed as pure collection tanks for waste. The barge can also be adapted to include combustion and or bio (gas/diesel) equipment for energy production.

Other:

A whole range of preparedness functions and others.

According to the present invention it has been found that a self-floating barge/tank having a unique and flexible water processing system, designed to be able to be lifted/raised out of the water and transported by a special ship, can reduce/prevent the negative consequences tied to escape, sea lice, spread of disease and, not least, welfare of the fish associated with modern aquaculture.

With the present invention one obtains a well-controlled transport system/breeding environment/fish farm with a physical barrier to the sea. This enables one to clean and control the content of the tanks and their discharge in a safe and sound manner so as to avoid subjecting nature to irreversible environmental damage, and to secure the welfare of the fish and thereby their quality.

Possible properties of propulsion unit 3:
Hull form having good seaworthiness, loading capability and economic capacity.
Interior facilities on board, such as cabins with their own shower and toilet, mess hall and lounge, laundry, wardrobe, and others.
Pilot house with operator positions for maneuvering the boat, remote control system for operation and monitoring of all systems, remote control of all cargo and fish handling systems and others. All systems, machinery, monitoring and the like are intended to be remote controlled and logged from the bridge via an automation system.
Engine room with main engine, auxiliary engine and generators, and so forth.
Safety equipment in accordance with current regulatory requirements.
Ballast system in accordance with current regulatory requirements.
Cranes and winches for the handling of loading hoses and assistance with the cages.

Possible properties of well unit 2:
Has adequate structural strength, with constructional solutions that prevent escape.
Has anchoring and towing systems. The anchoring system can be DP-controlled.
Construction that gives fish and shellfish a good opportunity for movement and other natural behavior.
Construction where sharp edges and projections have been removed and the choice of materials is not injurious to fish and shellfish.
Construction where one avoids unnecessary stresses for fish and shellfish on release and capture.
Construction that facilitates good cleaning.
Construction that protects fish and shellfish from attack by predators.
Alarm systems that warn of power failure and systems that measure the water quality parameters $O_2$, pH, salinity, temperature, etc.
Inlet and outlet systems designed in a manner to ensure sufficient water flow and quality.
Reserve systems that secure the basic physiological needs of the fish with respect to oxygen and metabolites in the event of unforeseen occurrences.
Duct system with hatches, for easy access and maintenance. A system where module-based equipment can easily be positioned and mounted in the ducts. This enables each barge to be tailor-made for different purposes. The equipment is connected to the electric system and slid into place in the duct. This eliminates downtime, since the equipment can easily be replaced by new and improved equipment.

Well units 2 can optionally be fitted with equipment such as:
Swim to land system,
Movable structures for gathering fish,
Bio and mechanical filter. Drum filter, disc filter, gravitation filter, MBBR.
Copper, silver filter,
Membrane filter for $CO_2$,
Ozone cleaning system,
System for regulating salinity, temperature, pH, $CO_2$ and oxygen,
Water jet, all types of pumps,
UV-light,
Dosing equipment,
Monitoring equipment, light, temperature, video, sound, etc.
Feeding system,
Salmon grate with drain,
Waste system. Incinerator. Collecting tank for waste, drying systems, etc.
Lighting equipment,
Underwater camera,
Sound equipment,
Washing and disinfecting equipment (automatic),
Equipment for renewable energy production . . . , wind, sun and waves,
Energy supply from land and special ships,
Flow technology,
Recycling equipment,
Slaughtering systems (electrical stunning, blow to head, etc.),
Anaesthesia systems,
Cooling systems, RWS,
Heating systems,
Fresh water production,
All types of materials: steel, composite material (fiber glass), aluminum, plastic etc.,
Possibility to take in water from all depths,
Sorting and counting equipment,
Others.

The invention claimed is:

1. An arrangement for a well boat- and service vessel (1) for transporting or storing fish or other aquatic organisms, the well boat- and service vessel (1) comprising: a self-floating, exchangeable well unit (2) for transporting live fish and other live aquatic organisms, the fish and aquatic organisms being transferred live from a first location to a second location; and
a propulsion unit (3),
wherein the propulsion unit comprises propulsion means (4), steering and positioning means, a dock (5) for the well unit, positioning and attachment means for positioning and securing the well unit (2) in the dock (5) while the well unit is filled with water and live fish, and a ballast system for raising and lowering the propulsion unit in the water, and
wherein the well unit includes a fish feeding system.

2. An arrangement for a well boat- and service vessel (1) for transporting or storing fish or other aquatic organisms, the well boat- and service vessel (1) comprising: a self-floating, exchangeable well unit (2) for transporting live fish and other live aquatic organisms, the fish and aquatic organisms being transferred live from a first location to a second location, where the well unit comprises a ballast system for raising and lowering the propulsion unit in the water; and a propulsion unit (3),
wherein the propulsion unit comprises propulsion means (4), steering and positioning means, a dock (5) for the well unit, positioning and attachment means for positioning and securing the well unit (2) in the dock (5) while the well unit is filled with water and live fish.

3. A system for a well boat- and service vessel (1) for transporting or storing fish or other aquatic organisms, the well boat- and service vessel (1) comprising: a plurality of self-floating, exchangeable well units for transporting live fish and other live aquatic organisms, the fish and aquatic organisms being transferred live from a first location to a second location; and
a propulsion unit (3),
wherein the propulsion unit comprises propulsion means (4), steering and positioning means, a dock (5) for at least one of the well units, positioning and attachment means for positioning and securing at least one of the well units in the dock (5), and
wherein each well unit includes a fish feeding system.

4. A method for the use of a well boat- and service vessel (1) for transporting or storing fish or other aquatic organisms, where the well boat- and service vessel comprises i) a self-floating, exchangeable well unit (2) for transporting live fish and other live aquatic organisms, the fish being transferred live from a first location to a second location and ii) a propulsion unit (3), where the propulsion unit comprises propulsion means (4), steering and positioning means, a dock (5) for the well unit, positioning and attachment means for positioning and securing the well unit (2) in the dock (5), and a ballast system for raising and lowering the propulsion unit in the water, the method comprising the steps of:
maneuvering the propulsion unit (3) to the well unit (2),
lowering the propulsion unit (3) down into the water by means of the ballast system so that the propulsion unit (3) is able to drive in under the well unit (2),
positioning and attaching the well unit (2) onto a surface of the dock (5) on the propulsion unit (3), wherein this operation comprises the act of raising the propulsion unit (3), during said positioning and attaching step, the well unit containing live fish, and
transporting the well unit (2) and the live fish therein with the aid of the propulsion means (4) on the propulsion unit to a destination at the second location,
wherein the live fish is live farmed fish and the destination is a fish processing location.

5. A method for the use of a well boat- and service vessel (1) for transporting or storing fish or other aquatic organisms, where the well boat- and service vessel comprises i) a self-floating, exchangeable well unit (2) for transporting live fish and other live aquatic organisms, the fish and aquatic organisms being transferred live from a first location to a second location and ii) a propulsion unit (3), where the propulsion unit (3) comprises propulsion means (4), steering and positioning means, a dock (5) for the well unit (2), positioning and attachment means for positioning and securing the well unit (2) in the dock (5), and wherein the well unit (2) comprises a ballast system for raising and lowering the well unit in the water, the method comprising the steps of:
maneuvering the propulsion unit (3) to the well unit (2),
raising the well unit (2) up in the water by means of the ballast system, so that the propulsion unit (3) is able to drive in under the well unit (2),
positioning and securing the well unit (2) onto a surface of the dock (5) on the propulsion unit (3), wherein this operation comprises the act of lowering the well unit (2) during said positioning and securing step, the well unit containing live fish, and
transporting the well unit (2) and the live fish therein with the aid of the propulsion means (4) on the propulsion unit (3) to a destination at the second location.

6. The method according to claim 4, wherein the propulsion unit (3) delivers the well unit (2) to the destination by reversing the given steps, whereupon the propulsion unit proceeds to another location to fetch another well unit, thereafter to bring this to a new destination.

7. The method according to claim 4, wherein the propulsion unit (3) delivers the well unit (2) to the destination by reversing the given steps, whereupon the propulsion unit (3) takes with it another well unit from the destination and brings the well unit to a new destination.

8. The method according to claim 5, wherein the propulsion unit (3) delivers the well unit (2) to the destination by reversing the given steps, whereupon the propulsion unit proceeds to another location to fetch another well unit, thereafter to bring this to a new destination.

9. The method according to claim 5, wherein the propulsion unit (3) delivers the well unit (2) to the destination by reversing the given steps, whereupon the propulsion unit (3) takes with it another well unit from the destination and brings the well unit to a new destination.

10. The method according to claim 4, wherein,
during said step of maneuvering the propulsion unit (3) to the well unit (2), the surface of the dock (5) onto which the well unit (2) is positioned during said position and attaching step, is located within the water, and
during said step of transporting the well unit (2), the surface of the dock (5) onto which the well unit (2) is positioned during said position and attaching step, remains located within the water.

11. The method according to claim 5, wherein,
during said step of maneuvering the propulsion unit (3) to the well unit (2), the surface of the dock (5) onto which the well unit (2) is positioned during said position and attaching step, is located within the water, and
during said step of transporting the well unit (2), the surface of the dock (5) onto which the well unit (2) is positioned during said position and attaching step, remains located within the water.

12. The method according to claim 5, wherein the live fish is live farmed fish and the destination is a fish processing location.

13. The arrangement of claim 2, wherein the well unit includes a fish feeding system.

14. The method according to claim 4, wherein the well unit includes a fish feeding system, and the method includes operating the fish feeding system during said transporting the well unit step.

15. The method according to claim 5, wherein the well unit includes a fish feeding system, and the method includes operating the fish feeding system during said transporting the well unit step.

* * * * *